United States Patent [19]
Hill et al.

[11] Patent Number: 6,018,746
[45] Date of Patent: Jan. 25, 2000

[54] SYSTEM AND METHOD FOR MANAGING RECOVERY INFORMATION IN A TRANSACTION PROCESSING SYSTEM

[75] Inventors: Michael James Hill, Vadnais Heights; Thomas Pearson Cooper, New Brighton; Dennis Richard Konrad, Welch; Thomas L. Nowatzki, Shoreview, all of Minn.

[73] Assignee: Unisys Corporation, Blue Bell, Pa.

[21] Appl. No.: 08/996,760

[22] Filed: Dec. 23, 1997

[51] Int. Cl.[7] .............................. G06F 12/08; G06F 12/02
[52] U.S. Cl. ........................... 707/202; 707/102; 711/148
[58] Field of Search .................................. 707/202, 4, 10, 707/200, 205, 201, 400, 102; 705/26, 35; 380/24; 714/4, 15; 711/144, 148, 141, 3, 119; 713/200, 201; 712/34, 218

[56] References Cited

U.S. PATENT DOCUMENTS

| | | | |
|---|---|---|---|
| 5,193,162 | 3/1993 | Bordsen et al. | 711/152 |
| 5,287,501 | 2/1994 | Comet | 707/202 |
| 5,307,481 | 4/1994 | Shimazaki et al. | 714/11 |
| 5,333,314 | 7/1994 | Masai et al. | 707/202 |
| 5,687,363 | 11/1997 | Oalid-Aissa et al. | 707/4 |
| 5,717,919 | 2/1998 | Kodavalla et al. | 707/8 |
| 5,809,527 | 9/1998 | Cooper et al. | 711/113 |

OTHER PUBLICATIONS

Byers, L.L. et al., U.S. Patent Application, 08/173,459, Attorney Docket No. RA–3264, filed Dec. 23, 1993, entitled "Extended Processing Complex for File Caching".

Cooper, T.P. et al., U.S. Patent Application, 08/174,750, Attorney Docket No. RA–3247, filed Dec. 23, 1993, entitled "Outboard File Cache System".

*Primary Examiner*—Daniel H. Pan
*Attorney, Agent, or Firm*—Charles A. Johnson; Mark T. Starr; Altera Law Group

[57] ABSTRACT

A system and method for organizing and managing recovery information on a per-transaction basis using distinct memory structures is provided. A transaction processing system includes one or more transaction request units for initiating data transactions with a database. A memory architecture includes storage modules to store transaction recovery information that is used in recovering from a transaction processing failure, and further includes transaction descriptor memory structures each of which correspond to a distinct transaction. The transaction descriptors allow access to the transaction recovery information to be isolated from other transaction recovery information. A control information field in each transaction descriptor stores a transaction identifier that identifies the distinct transaction to which it corresponds. The transaction descriptor also includes multiple information address fields, each of which includes a pointer to one of the storage modules that stores part of the transaction recovery information associated with the transaction identifier.

23 Claims, 8 Drawing Sheets

SYSTEM AND METHOD FOR MANAGING RECOVERY INFORMATION IN A TRANSACTION PROCESSING SYSTEM

FIELD OF THE INVENTION

This invention relates generally to information recovery in transaction processing systems, and more particularly to a system and method for organizing and managing recovery information on a per-transaction basis using distinct memory structures accessible to each host processor in the transaction processing system.

BACKGROUND OF THE INVENTION

Many computing systems today utilize multiple processing units, resulting in a computer architecture generally referred to as multi-processing. Multi-processing systems are often used for transaction processing, such as airline and banking systems. Transaction processing refers generally to a technique for organizing multi-user, high volume, on-line applications that provides control over user access and updates of databases. A transaction refers to the execution of a retrieval or an update program in a database management system. Transactions originating from different users may be aimed at the same database records.

It is important that system hardware or software failures do not result in the loss of database records, or in an "inconsistent" database. The system should be recoverable, which refers to the consistency, integrity and restoration characteristics of an application's database and message environment. A system is recoverable if the process of making permanent all requested database changes and messages is completed even if a host failure occurs during the process of "committing", which refers to the process of making database changes permanent. The system must also maintain indivisibility, which means that all of each transaction's requested database changes and messages must be made permanent as a unit only if the transaction completes successfully; otherwise all must be nullified. This characteristic ensures that the overall database contents are consistent and that the transaction's messages reflect the results of such database contents.

Prior art transaction processing systems provide for recoverability by providing separate permanent data storage devices for each functional module in the system. While this is described in greater detail in connection with FIG. 1, the prior art generally required information associated with each functional module (i.e., "component") of each host processor to be backed up on numerous external disks or tapes. Therefore, the prior art provides recovery files on a component basis to provide performance to the transaction processing during on-line operations, which results in the need for a large amount of external storage space, particularly where multiple hosts are present. Such a distributed system requires a large amount of external disk or tape, and is difficult to access from other host processors. Furthermore, because disks or tapes must be maintained for these recovery files, recovery involves a great deal of sequential interaction between the components.

The present invention avoids the problems associated with such a distributed recovery system, and provides a centralized, commonly accessible system for effecting recovery actions in a data processing system. The present invention therefore provides a solution to the aforementioned problems and other shortcomings, and offers numerous advantages over the prior art.

SUMMARY OF THE INVENTION

The present invention relates to a system and method for organizing and managing recovery information on a per-transaction basis using distinct memory structures accessible to each host processor in the transaction processing system.

In accordance with one embodiment of the invention, a memory architecture for managing data recovery on a per-transaction basis in a transaction processing system is provided. The transaction processing system includes one or more transaction request units for initiating data transactions with a database. The memory architecture includes storage modules to store transaction recovery information that is used in recovering from a transaction processing failure, where transaction processing failures include transaction transmission failures, host processor failures, and system component/module failures. Transaction descriptor memory structures which each correspond to a distinct transaction are provided. The transaction descriptors allow access to the transaction recovery information to be isolated from other transaction recovery information. A control information field in each transaction descriptor stores a transaction identifier that identifies the distinct transaction to which it corresponds. The transaction descriptor also includes multiple information address fields, each of which includes a pointer to one of the storage modules that stores part of the transaction recovery information associated with the transaction identifier.

In accordance with another embodiment of the invention, a transaction processing system is provided for controlling data transactions between user terminals and a database, and for restoring the database to a previously valid state in the event of a transaction processing failure. One or more host processors are coupled to the user terminals to process transaction requests using transaction programs. Data storage modules are also provided to store data transaction recovery information. Multiple transaction memory structures are provided, each of which correspond to a distinct transaction to isolate accessibility of the transaction recovery information to the corresponding transaction memory structure. Each transaction memory structure includes a control information field to store a transaction identifier that identifies the distinct transaction to which it corresponds, and further includes multiple information address fields. Each information address field stores a data pointer to a specific data storage module which stores a portion of the data transaction recovery information associated with that distinct transaction. A database recovery processor is configured to utilize the transaction identifier to locate the transaction memory structure that corresponds to a failed transaction. The recovery processor can then restore the database to a previously valid state using the data transaction recovery information identified by the information address fields.

In accordance with another aspect of the invention, a method for organizing recovery operations in a transaction processing system is provided. The transaction processing system includes multiple host processors and a database. The method includes requesting execution of a database transaction from a user terminal to one of the host processors, where the database transaction includes one or more database updates. A unique transaction memory structure is created for each transaction, where the transaction memory structure includes a transaction identifier and multiple links to distinct storage banks. Recovery information corresponding to the database transaction is stored in the distinct storage banks. Upon failure of the transaction, host, or component/module, the recovery information corresponding to the database transaction is accessed using the transaction identifier and the links of the transaction memory structure. The database is then restored to a previously valid state by applying the recovery information to the database. In one embodiment of the invention, the transaction memory structure is created by allocating a portion of a memory at the inception of the transaction identified by the transaction identifier. This portion of the memory is then partitioned into memory fields, where each field stores one of the links to the distinct storage banks.

Still other objects and advantages of the present invention will become readily apparent to those skilled in this art from the following detailed description, where the preferred embodiment of the invention is shown by way of illustration of the best mode contemplated of carrying out the invention. As will be realized, the invention is capable of other and different embodiments, and its details are capable of modification without departing from the invention. Accordingly, the drawing and description are to be regarded as illustrative in nature, and not as restrictive.

DETAILED DESCRIPTION OF THE ILLUSTRATED EMBODIMENTS

Figure 1:
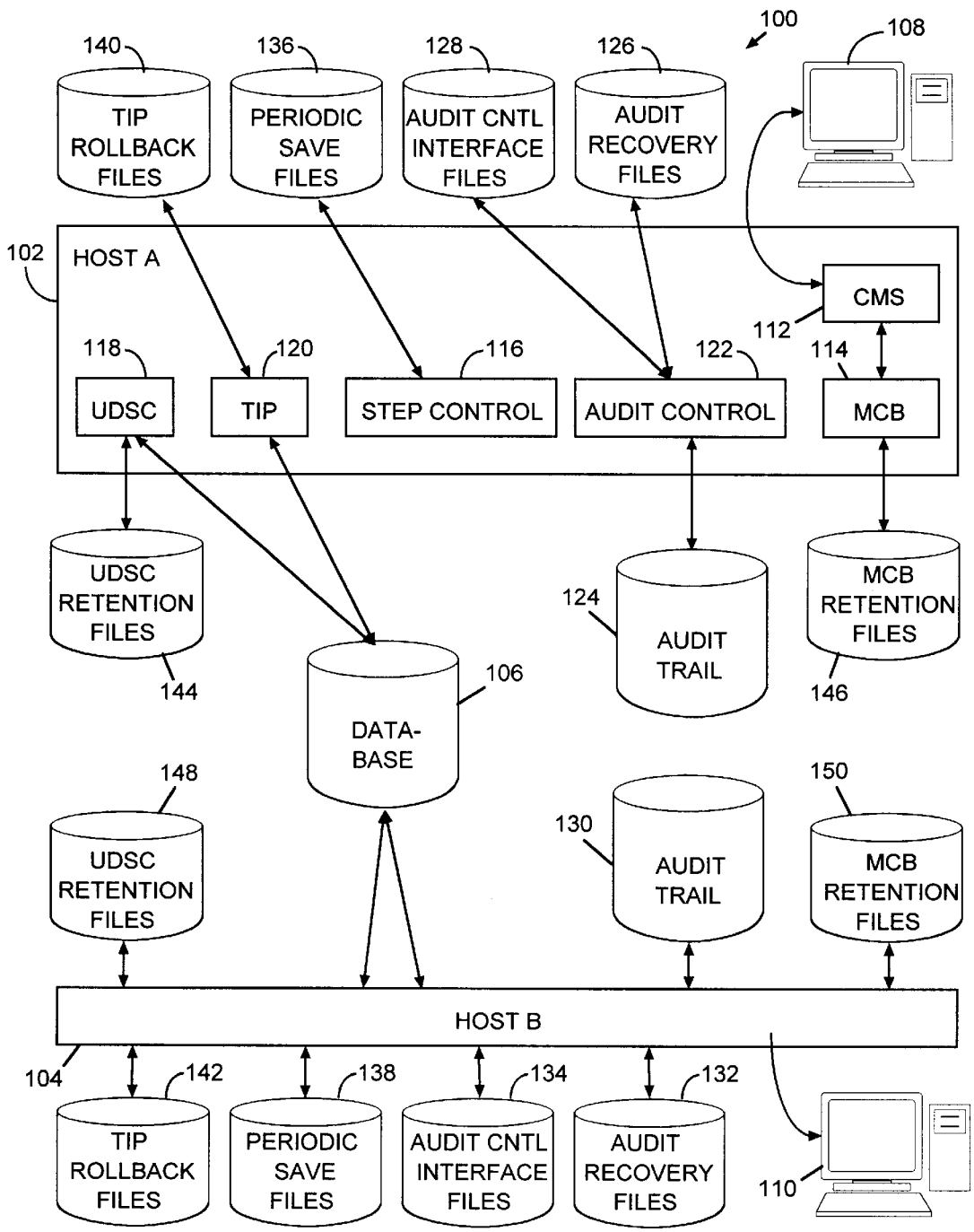
FIG. 1 is a block diagram illustrating a prior art multi-processor transaction processing system.

FIG. 1 is a block diagram illustrating a prior art multi-processing system 100. The multi-processing system of FIG. 1 includes host A 102 and host B 104. Each host 102, 104 is coupled to a common database 106. Each host 102, 104 is also coupled to a user terminal, depicted by computing devices 108, 110, respectively.

When a user initiates a database transaction on a user terminal, such as computing device 108, the transaction request is sent in the form of a message from the terminal to the Communications Management System (CMS) communication program 112. The CMS program 112 provides handshaking protocols between the host and the terminal. The CMS module 112 forwards the message to the Message Control Bank (MCB) 114, which is a software module that manages all transaction-related messages received by the host from the terminal (source messages), or sent by a transaction to a terminal (destination messages). In turn, the MCB 114 notifies the step control module 116 that a message was received. The step control 116 is a software module that coordinates the activities of all components participating in a database transaction, including the MCB 114, the Universal Data System Control (UDSC) management system 118, and the Transaction Interface Processing (TIP) management system 120.

The UDSC 118 and the TIP 120 represent database management systems which provide services to ensure the integrity of the database. For example, the UDSC 118 and the TIP 120 ensure that either all updates associated with the transaction are applied to the database, or none of the updates are applied to the database, in the event that a failure occurs during a transaction. Single database management systems could be used rather than the bifurcated database management system comprising the UDSC 118 and the TIP 120, but in the system of FIG. 1, the UDSC 118 is a relational database management system which provides a large searching capability, and the TIP 120 database management system is a "flat" or "linear" management system that provides fewer search capabilities, but faster database accesses in many circumstances. Therefore, depending on the nature of the user requests, one or possibly both of the database management systems will participate in a database transaction.

The host B 104 also includes software modules including a CMS, MCB, step control, a UDSC, and the TIP (not shown). These software modules work analogously to the software modules in other hosts of the multi-processing system, such as host A 102.

During transaction processing, the UDSC 118 and/or TIP 120 database management systems generally retain a copy of the existing data whenever the transaction requests a database update. If the transaction proceeds to a stable point where it can be "committed," all new updated data secured to the database by the UDSC 118 and/or TIP 120 database management systems. If the transaction does not proceed to a stable point because a transaction, host or component/module failure occurs before this committed state can be achieved, none of the updates are applied, but rather are "rolled back" so that the previous copy of the data is maintained. A rollback procedure is therefore used when a transaction, host or component/module failure occurs during a database update. In order to revert to a previous database record if a failure occurs during an update attempt, each database record is saved to a file referred to as a retention file. The database management system retention files are used for each host in a multi-processing system to save the current valid state of the database during database updating. Audit data files are used to store the proposed database update during database updating, which is ultimately provided to the audit trail if the database update completes successfully.

In order to revert to the previous copy of data in the event of a storage disk failure, each database update is ultimately saved to a storage device referred to as an "audit trail". An audit trail is used for each host in a multi-processing system to save the previous state of the database at a location remote from each of the hosts. This stored information can be applied to negate the effects of any requested updates to the database which were affected by the disk failure. Audit trail recovery is used to recover from a database storage medium (e.g., disk) failure after the database updates have already been made to the database.

In the prior art system of FIG. 1, each host processor includes an audit control module, illustrated as the audit control 122 in host A 102. The audit control module 122 generates the audit trail 124 information which allows database changes and message processing activity to be recorded while the application is on-line. The audit trail contents include a chronological record of the source messages, destination messages, transaction state events and database updates. The audit trail includes a long-term storage media such as a series of disks or a series of tapes, and can be used for historical analysis and bookkeeping. However, one main purpose of the audit trail data is to recover or rebuild the database if a database disk failure occurs.

In order to recover from a database disk failure, a copy of all database records are periodically saved to disk or tape, commonly referred to as "database dump tapes". If a database disk fails, the database records on that disk are retrieved from the most recently saved state of the database dump tapes, and copied onto a repaired or replaced disk. Database updates which occurred subsequent to the most recent database dump are then copied from the audit trail 124 to the repaired or replaced disk. For example, the audit control interface (ACI) files 128 identify the storage media used by audit control 122, such as tape or disk identifiers. In addition to the media identification, control information such as the start and end times and number of audit records written are included in the ACI files 128. The audit recovery files (ARF) 126 are used by the audit control 122 to properly recover from a host failure by using the ARF 126 to determine the point at which audit file storage was occurring within the audit trail at the time of the failure.

Besides database disk failures, software failures may also occur in the various software components within the system. These software failures include failures in the host operating system itself, the step control 116, UDSC 118, TIP 120, and audit control 122. Each component includes its own recovery file to guard against a host operating system or component failure. Where a system or component failure occurs, step control 116 uses the periodic save files 136, along with the audit trail 124, to recover the state of every transaction. MCB 114 uses the MCB retention files 146 to recover the source and destination messages for every transaction. Database changes are recovered for the database management systems, such as TIP 120 and UDSC 118, using the TIP rollback files 140 and the UDSC retention files 144 respectively.

Each host includes analogous recovery files. For example, host B 104 includes an audit trail 130 and associated audit recovery files 132 and audit control interface files 134, periodic save files 138, TIP rollback and UDSC retention files 142, 148, and MCB retention files 150.

The recovery files (i.e., audit recovery files 126, 132, audit control interface files 128, 134, periodic save files 136, 138, tip rollback files 140, 142, UDSC retention files 144, 148 and MCB retention files 146, 150) associated with a system such as the prior art multi-processing system 100 of FIG. 1 are stored in a permanent storage device such as a disk. Therefore, the prior art provides recovery files on a component basis to provide performance to the transaction processing during on-line operations. As can be seen in FIG. 1, this results in a large amount of required external storage space, particularly where multiple hosts are present. Such a distributed system therefore requires a large amount of external disk or tape, and is difficult to access from other host processors. Furthermore, because disks or tapes must be maintained for these recovery files, recovery involves a great deal of sequential interaction between the components. The present invention avoids the problems associated with such a distributed recovery system, and provides a centralized, fast, and accessible system for executing transactions in a data processing system.

Figure 2:
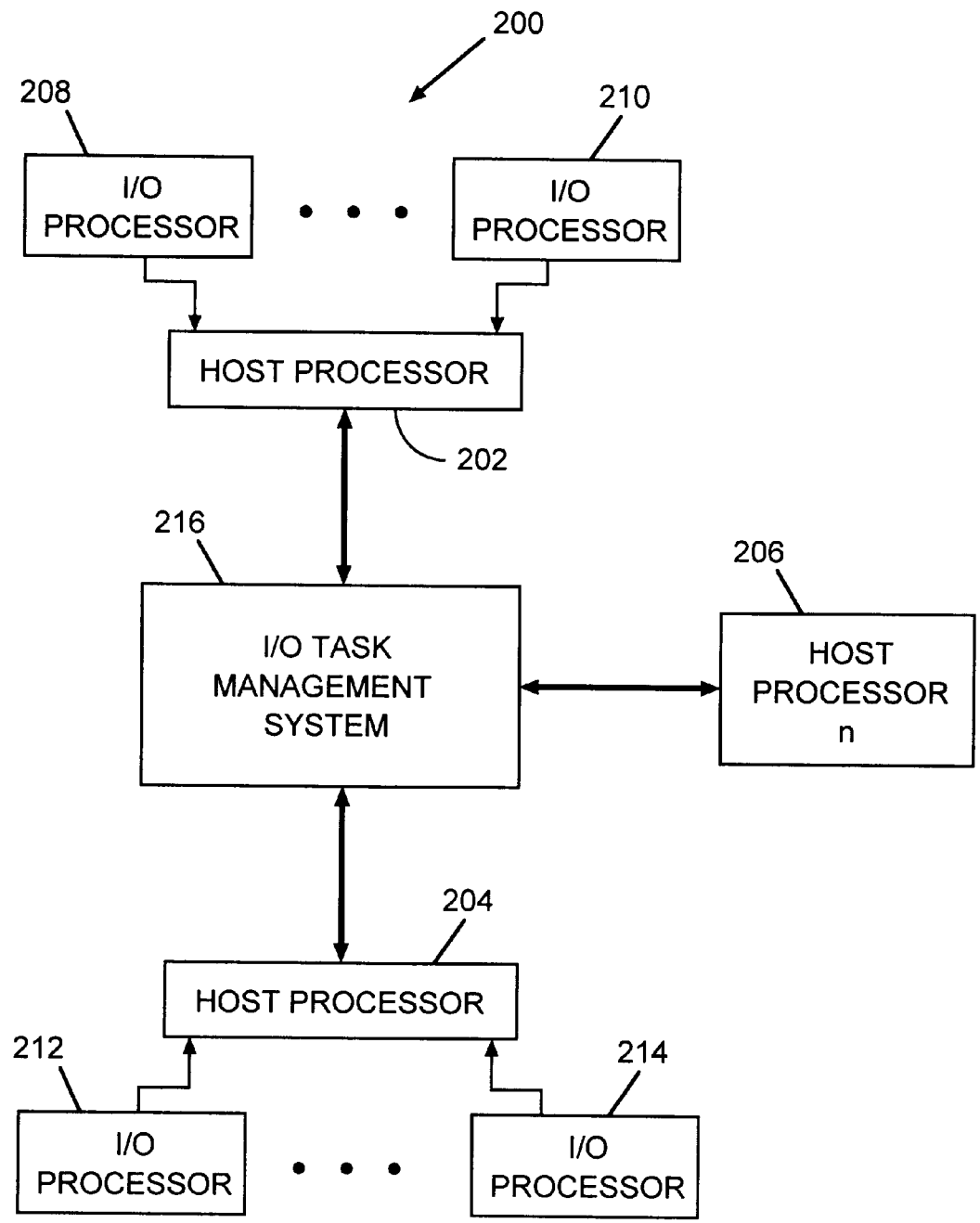
FIG. 2 is a block diagram of one embodiment of a multi-processing computer system providing I/O task management in accordance with the present invention.

FIG. 2 is a block diagram of one embodiment of a multiprocessing computing system 200 providing I/O task management in accordance with the present invention. Multiprocessing typically refers to the operation of more than one processing unit within a single system, simultaneous program execution, or both. Multiple host processors may operate in parallel to enhance speed and efficiency. Separate processors may also take over communications or peripheral control, for example, while the main processor continues program execution. A host processor generally refers to the primary or controlling computer in a multiple computer network. In the multiprocessing computing system 200 of FIG. 2, each of a plurality of multiple host processors 202, 204 through host processor n 206 are coupled together to create a robust multiprocessing system. Each of the host processors typically includes memory, and may actually be comprised of multiple instruction processors (IPs) to create an aggregate host processing function.

In order to more efficiently control input and output functions, each of the host processors is interfaced to input/output (I/O) processors, which perform functions necessary to control I/O operations. The I/O processors relieve host processors from having to execute most I/O-related tasks, thereby allowing host processing functions to be expedited. In FIG. 2, any number of I/O processors may be coupled to a particular host processor. For example, host processor 202 is coupled to n processors, illustrated by I/O processors 208 to 210. Similarly, host processor 204 is shown coupled to a plurality of I/O processors 212, 214, and host processor n 206 is depicted as a stand-alone processor having no interfaced I/O processors.

Multiprocessing systems are used for various computing functions, including large database applications. A database generally refers to the large, shared, mass-memory data collections, and the technology to support efficient retrieval and reliable update of persistent data. Database management systems operable within the multiprocessing system comprises a collection of programs which interface with application programs and manage data on the application programs' behalf. The database management system provides data independence and integrity, and allows the database to maintain consistent data.

Multiprocessing systems should also provide for controlled recovery in the event of a failure of one or more of the processors or associated circuitry. This has typically been accomplished through the use of external tapes and disks configured in a distributed manner, as was described in connection with FIG. 1. The present invention provides a centralized recovery system, which allows operable processors to access recovery data corresponding to inoperable processors. The present invention provides a centralized, non-volatile memory to provide such accessibility, which also avoids the need for separate tapes or disks for each component in which recovery information is saved. A linked-list data structure allows each transaction to be stored and organized on a "per transaction" basis, rather than on a "component" basis, which provides for very organized and speedy data recovery following a failure of any of the system components.

This capability is accomplished by the I/O task management system 216, which interfaces to each of the host processors 202, 204, 206 in the multiprocessing computing system 200. In one embodiment of the invention, the I/O task management system 216 provides "transaction descriptor" data structures, which simplify recovery in the event that a host failure occurs in the multiprocessing system.

Figure 3:
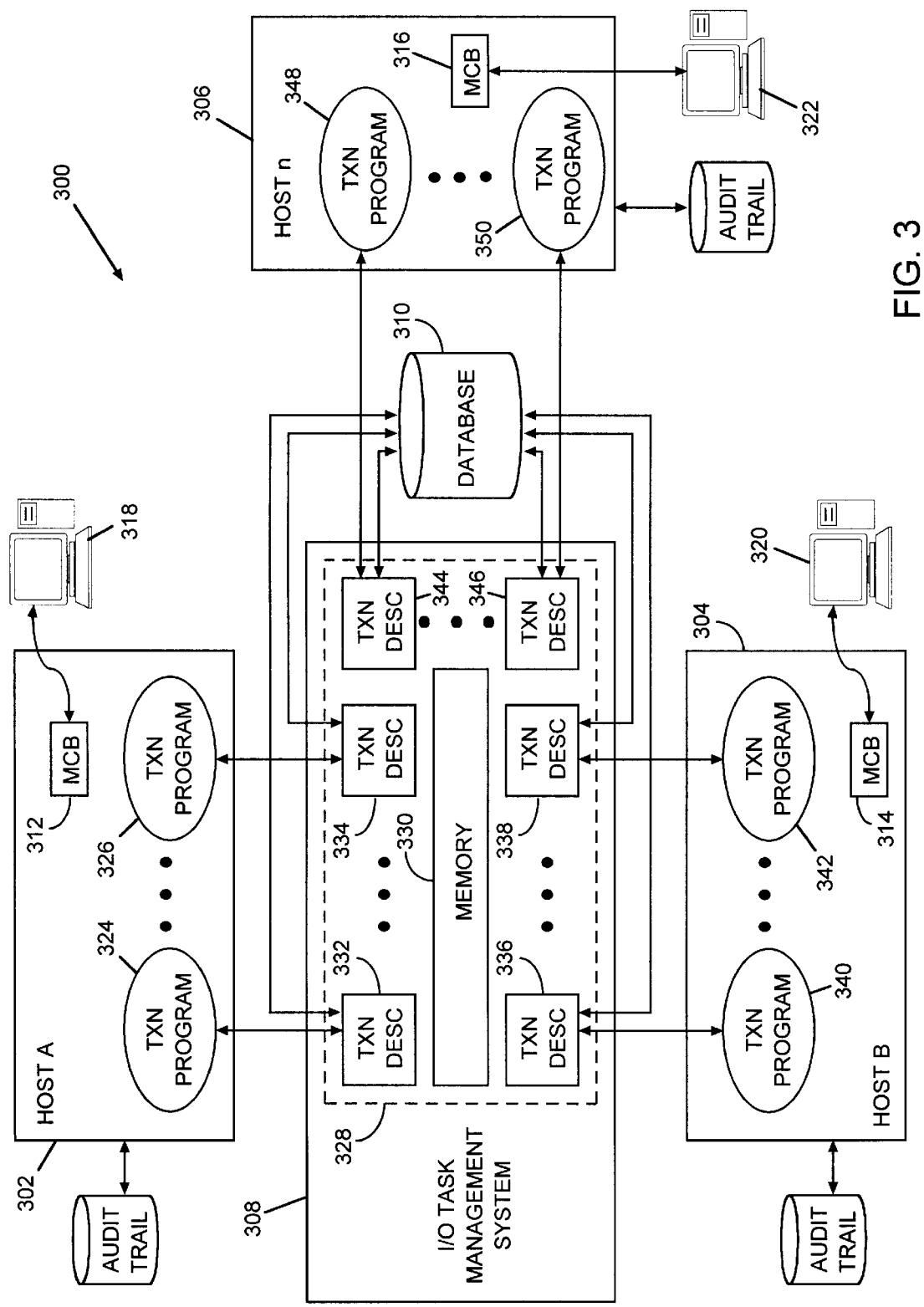
FIG. 3 is a block diagram of a transaction processing system in accordance with the present invention.

FIG. 3 is a block diagram of a transaction processing system 300 in accordance with the present invention. A plurality of host processing units, labeled host A 302, host B 304, through host n 306, are coupled to a common input/output (I/O) task management system 308. Data transactions from any of the host processors 302, 304, 306 to the database 310 are accomplished via the I/O task management system 308. Each of the host processors 302, 304, 306 includes a Message Control Bank (MCB) 312, 314, 316, respectively, which in turn are coupled to one or more user interfaces depicted as computing devices 318, 320, 322, respectively. Each processor also includes storage control and database management components (not shown).

When a database transaction is initiated at a user terminal such as user terminal 318, the MCB 312 receives the transaction request and notifies a control module such as the step control module (not shown) that a message was received. Under the coordination of the step control module, one or more transaction programs, depicted at host A 302 as transaction program 324 through transaction program 326, provide an interface for the transaction request to the I/O task management system 308. The transaction programs represent any program capable of receiving a data transaction request and initiating a request to update or read information from the database 310. Examples of such transaction programs include banking system application programs and airline reservation programs. For example, an airline reservation program can receive database update requests from a user terminal 318, and can cause the database 310 to be updated accordingly. Each of the other host processors 304, 306 in the transaction processing system 300 also include one or more transaction programs.

The I/O task management system 308 of the present invention includes a non-volatile memory 328 which provides a centralized storage location for various files, versus the distributed external tape and disk file storage systems of the prior art. The non-volatile characteristics of the memory 328 provide the benefits of permanent external disk or tape storage, while also providing high-speed data storage and retrieval, and a centralized storage location which is accessible by each of the host processors in the transaction processing system 300.

Within the non-volatile memory 328 is a file memory 330 which is used to store data structures necessary for successful recovery in the event that a catastrophic failure occurs in any of the host processors 302, 304 through 306. The data structures included in the file memory 330 will be described in further detail in connection with FIGS. 4 and 5 below.

The non-volatile memory 328 also includes several other data structures implemented from the non-volatile memory which are referred to as transaction descriptors. A transaction descriptor is provided for each of the transaction programs operating under the control of the host processors. For example, transaction descriptors 332 through 334 correspond to each of the transaction programs 324 through 326 of the host A processor 302. Similarly, transaction descriptors 336 through 338 correspond to transaction programs 340 through 342 of the host B processor 304, and the transaction descriptors 344 through 346 correspond to the transaction programs 348 through 350 of the nth host processor labeled host n. Each of the transaction descriptors in the I/O task management system 308 is accessible to every host processor in the transaction processing system 300. The transaction descriptors store control information and message data provided by the database management systems within each host processor on a per-transaction basis in one central location, instead of having separate, specialized data structures and files for each component.

Figure 4:
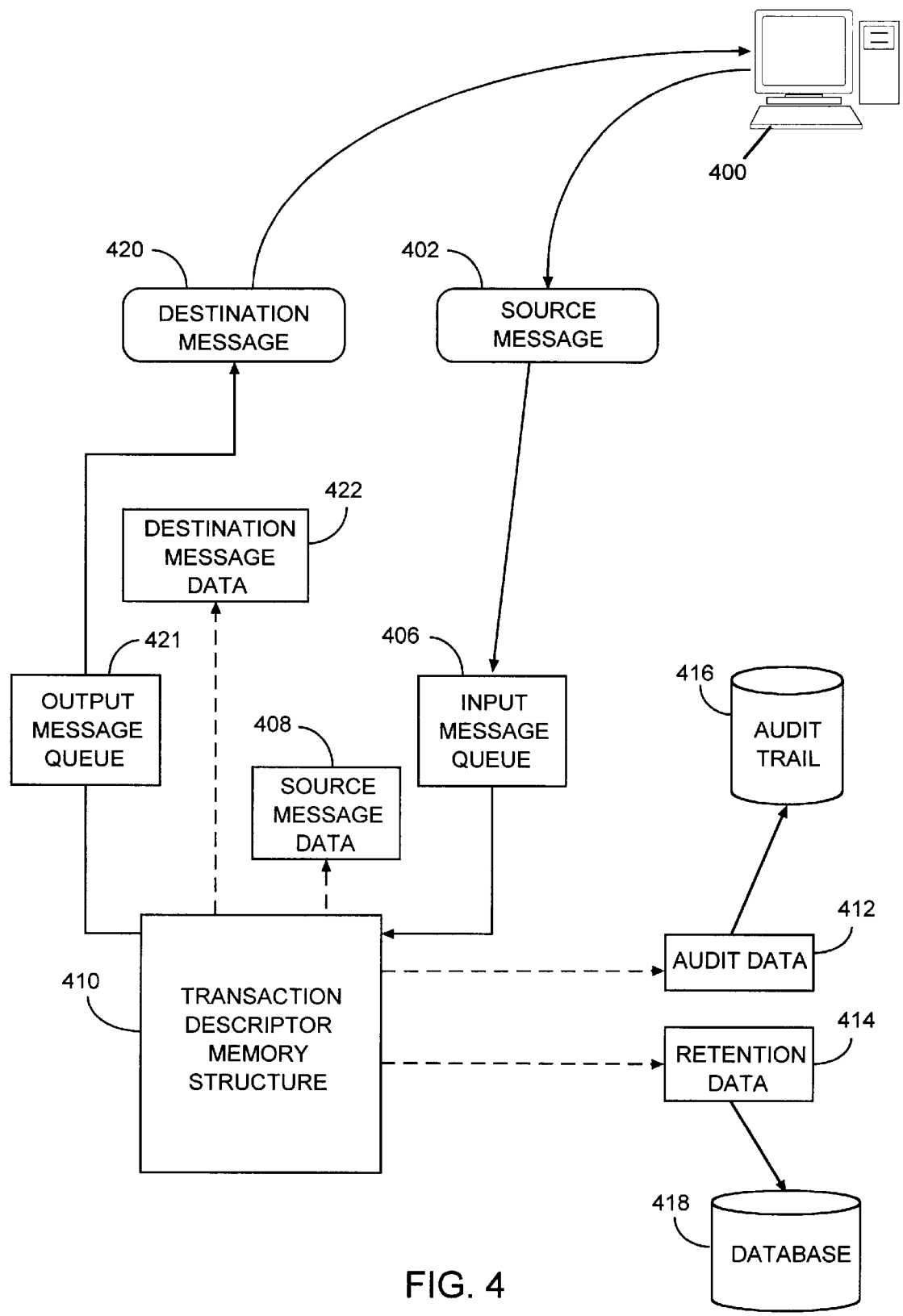
FIG. 4 illustrates a transaction flow for user requests which utilize transaction descriptors for updating and retrieving data from the common database.

FIG. 4 illustrates a transaction flow from a user terminal 400 which ultimately utilizes a transaction descriptor for updating and retrieving data from the common database. A transaction is initiated when the user terminal 400 issues a source message 402. The source message contains the message data as well as other information such as an identification of the transaction program that provided the message. The source message is received at the associated host processor, and forwarded to the I/O task management system where it's corresponding data is stored in a non-volatile source message data structure 408, the location of which is identified by the source message stored in an input message queue 406. Step control schedules the transaction program subject to system resources, and when scheduled, a transaction descriptor memory structure 410 is allocated within the non-volatile memory. When the transaction descriptor memory structure 410 has been provided, the source message queued in the input message queue 406 is requeued in a predetermined location within the transaction descriptor 410, so that the transaction descriptor includes a pointer to the corresponding source message data in the source message data structure 408. The transaction descriptor memory structure 410 also stores pointers or links to the audit data 412 and the retention data 414 which ultimately may affect the data stored in the audit trail 416 and the database 418, respectively. When a transaction has been completed, a destination message 420 generated by the transaction program 404 is returned to the user terminal 400 to acknowledge completion of the transaction or otherwise provide status. Any data associated with the destination message 420 is stored in the destination message data structure 422, and is identified by an address or pointer stored at a predefined location within the transaction descriptor memory structure 410. Upon committing the data, the destination messages are queued for subsequent transmission to the user terminal by moving the destination message pointer from the transaction descriptor memory structure 410 to the output message queue 421. As can be seen by the foregoing description, the transaction descriptor 410 provides a non-volatile, centralized memory structure which is structured on a per-transaction basis.

Figure 5:
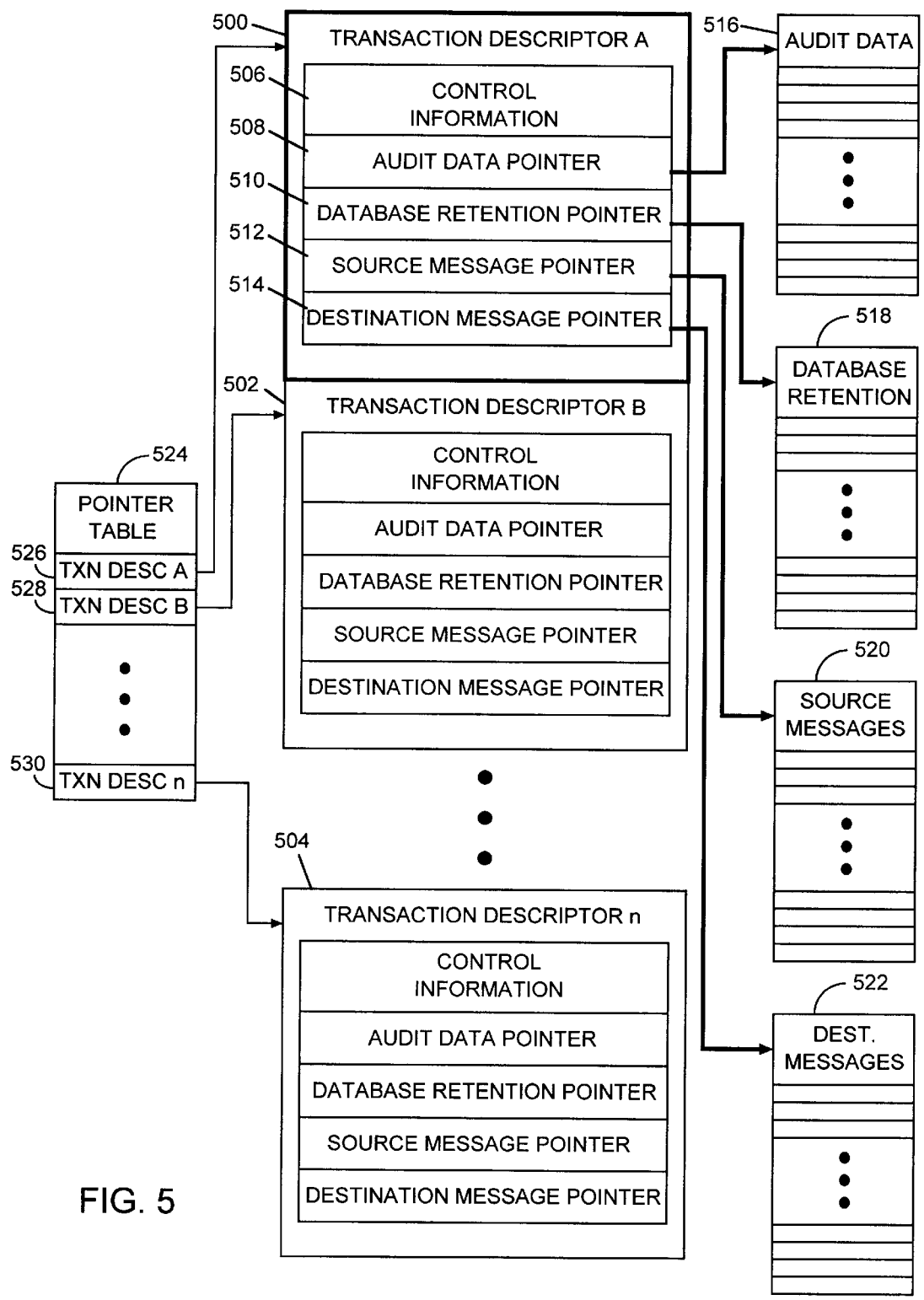
FIG. 5 illustrates a linked-list structure comprising multiple transaction descriptors.

FIG. 5 illustrates a linked-list structure comprising multiple transaction descriptors. The transaction descriptors are data structures which manage changes to the database, audit trail or other data retention structures on a per-transaction basis. A number of these transaction descriptors can be predefined, and any additional transaction descriptors required can be created by the I/O task management system when needed.

Each of the transaction programs in the computer system is associated with a transaction descriptor, which, in one embodiment of the invention, is created by scheduling its corresponding transaction program. The transaction descriptors illustrated in FIG. 5 include transaction descriptor A 500, transaction descriptor B 502, through transaction descriptor n 504. In one embodiment of the invention, each transaction descriptor includes a plurality of memory fields. For example, transaction descriptor A 500 includes a control information field 506, and audit data pointer field 508, a database retention pointer field 510, a source message pointer 512, and a destination message pointer 514. Transaction descriptors B 502 through transaction descriptor n 504 include analogous memory fields.

The control information field 506 includes control information, such as information that identifies which particular transaction that transaction descriptor is associated with. This allows information associated with a transaction to be quickly located. The control information also identifies which of the host processors initiated the database transaction, and further identifies the state of the transaction. This includes an "active" state when the transaction is in execution, and a "terminated" state which includes an indication as to whether the transaction has been committed or rolled back.

To protect against loss of data in the event of a catastrophic disk failure, each database update is saved to storage referred to as an "audit trail". Each system includes an audit trail storage medium. The audit trail information can be applied to an older version of the database to recreate the latest copy of the database if that copy of the database is lost as a result of the failure. Audit data corresponding to the pending database update is stored during the database update, and is provided to an audit data queue to be applied to the audit trail when the transaction is committed or rolled back. Further, when a database transaction has not yet reached a state where the corresponding database updates can be permanently applied to the database, the transaction has not yet been committed. If a failure occurs before updates are committed, the updates must not be applied to the database in order to maintain data consistency. The use of database retention data, described more fully below, prohibits database updates from occurring in these instances.

The audit data pointer field 508 includes an identifier that designates the location of audit data. The identifier may be in the form of an address, pointer, or other link that identifies the audit data memory structure 516 location of the audit data. The audit data includes the currently pending data updates, which is temporarily stored until it can be queued to the audit trail when the transaction is committed or rolled back.

Transaction descriptors make the creation of the audit trail more efficient. Because the transaction descriptors are stored in a non-volatile storage medium, the audit data need not be written immediately to the audit trail at transaction termination (e.g., commit or rollback) to protect the data. Instead, the audit data can be queued within the non-volatile memory. This increases system throughput, as a host can begin a new transaction without waiting for the audit trail data to be recorded. Additionally, the use of transaction descriptors minimizes the amount of data that must be written to the audit trail, because the transaction identifier need only be recorded once for the data included in the transaction descriptor, and need not be repeated for every update associated with the transaction.

The arrangement and use of audit data and audit trail recovery information may be determined in a manner described herein and in copending U.S. Patent application, Docket No. 11581.11-US-01, Ser. No. 08/997,115 entitled "System and Method for Arranging Database Restoration Data for efficient systems Data Recovery in a Transaction Processing System", which is assigned to the assignee of the instant application, filed on Dec. 23, 1997 the contents of which are incorporated herein by reference.

The database retention pointer field 510 includes an identifier that designates the location of database retention data. In one embodiment of the invention, the memory 330 includes a cache memory which, as is known to those skilled in the art, operates on the principle that certain memory locations will soon be accessed based on a current accessed memory location, or that certain memory locations tend to be accessed more often. A transaction initiated by a user may attempt to modify one or more predefined segments of the database that are stored in the cache memory. In one embodiment, these predefined portions are referred to as "pages", and include a number of 28-word blocks. Those blocks already existing at locations within the cache that are targeted for modification by the transaction are temporarily stored in a database retention memory structure 518.

Whether a block will be modified or not can be determined by comparing the transaction page to the corresponding page stored in the cache. The blocks of retention data which are to be modified are temporarily stored in the database retention memory structure 518 in order to save the most recently known valid state of these blocks of data which are targeted as a result of the transaction. The retention file data is stored in the database retention memory structure 518 before the cache copy of the data is modified, and the cache copy of the data is then updated to reflect the database modifications resulting from the transaction upon being "committed". The retention file data can then be used to vacate the changes and restore the database to its prior valid state in the event that a failure occurs which prevents the new data from being committed.

The source message pointer field 512 includes an identifier that designates the location of source messages received by way of scheduling a particular transaction program by step control. Therefore, when a source message is sent via a host processor to the I/O task management system 216, the source message itself is stored in the source message data structure 520, and a pointer or link identifying the location of the message data is stored in the source message pointer field 512 as part of the transaction descriptor A 500 when the transaction program which is providing the transaction has been scheduled. More particularly, the pointer is stored first in the input message queue 406 of FIG. 4, and when the transaction is scheduled, the transaction descriptor A 500 is allocated (or created if necessary) and the source message pointer is moved to the source message pointer field 512.

The destination message pointer field 514 includes an identifier that designates the location of destination messages that are to be returned to a user terminal by way of a particular transaction program. Destination messages are used to return status or provide an acknowledgment that a request has been handled accordingly. The destination messages are stored in the destination message data structure 522, and a pointer to the associated destination message is stored in the destination message pointer field 514.

All information associated with a particular transaction is therefore organized via the transaction descriptor 500. In other words, each transaction is organized on a per-transaction basis, which simplifies recovery operations. Furthermore, transaction information can be stored in the centralized, non-volatile memory rather than requiring external storage banks for each component (e.g., database management systems and the like). The transaction descriptors also expedite recovery processing in a multi-host system by allowing operable host processors to perform recovery operations, which is possible because the transaction descriptors are linked in a common non-volatile memory accessible by all host processors. Therefore, one or more non-failing hosts can access the transaction descriptors for the failing host. A designated recovery host may read the failing host's transaction descriptors and perform a commit or rollback according to the information included therein.

The linked-list structure of transaction descriptors 500, 502, 504 depicted in FIG. 5 are arranged according to the contents of a pointer table 524 in one embodiment of the invention. In this embodiment, the pointer table 524 stores pointers 526, 528 through 530 to the address of each of the transaction descriptors A 500, B 502 through transaction descriptor n 504 respectively, so that desired transaction descriptors can be quickly and easily located.

Each executing transaction program can terminate under one of two conditions, "commit" or "rollback". If the transaction proceeds to a stable point where it can be committed, all new updated data is secured to the database by the database management systems. Therefore, all of the transaction's previously requested database changes and destination messages are made permanent in an indivisible and recoverable manner. If the transaction does not proceed to a stable point because a failure occurs before this committed state can be achieved, none of the updates are applied, but rather are "rolled back" so that the previous copy of the data is maintained.

Figure 6:
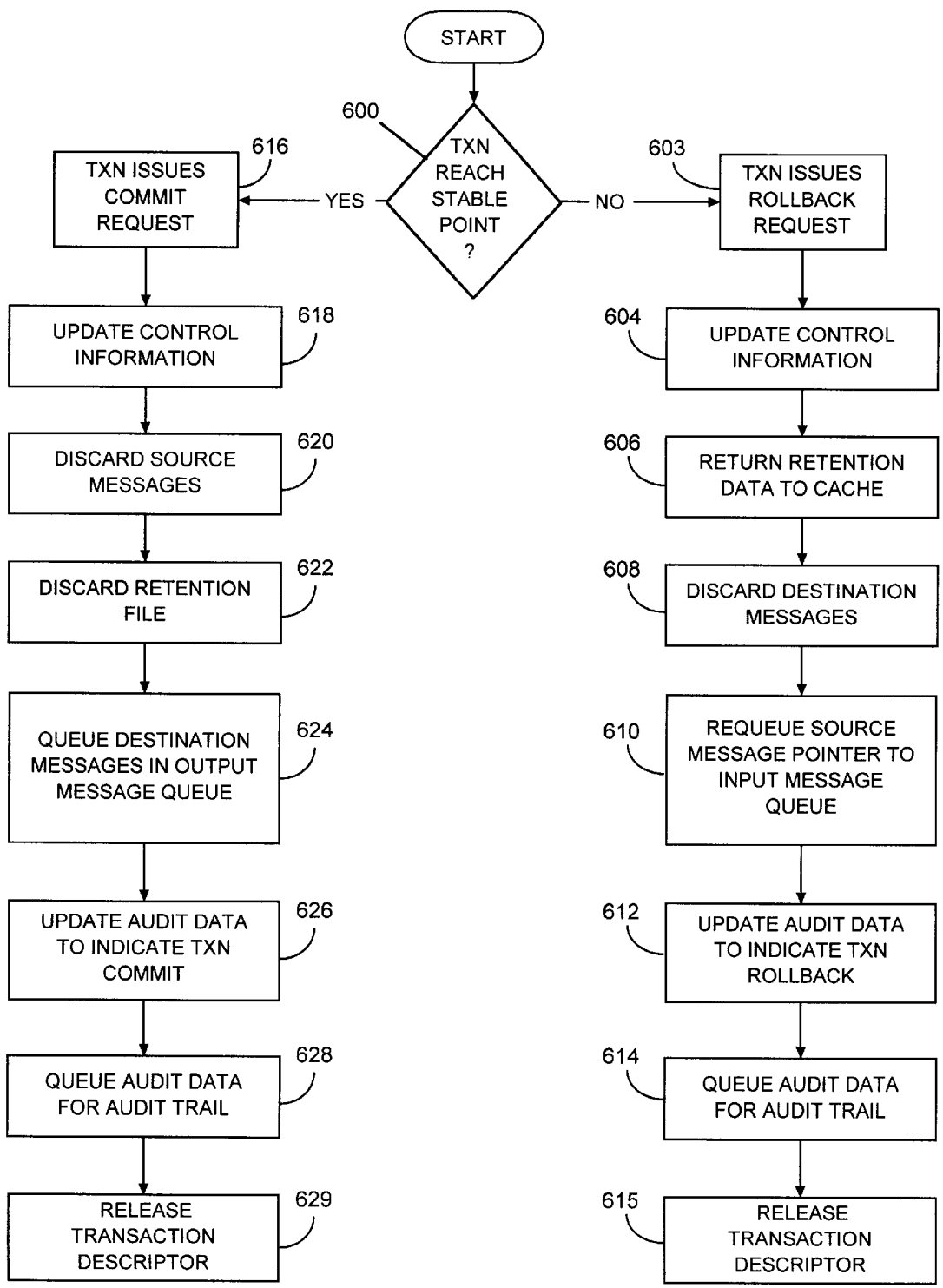
FIG. 6 is a flow diagram illustrating one embodiment of transaction commit and rollback processing in accordance with the present invention.

FIG. 6 is a flow diagram illustrating one embodiment of transaction commit and rollback processing in accordance with the present invention. The transaction program itself determines when a stable point has been reached, as shown at step 600. A "stable" point is the point at which the database updates can be committed. The logic in the transaction must be specific to the nature of the application database that it is processing against. For example, in a banking application, records in an individual's account and an inter-bank account might have to be updated to reflect a transfer of funds. Similarly, a query request to change all employees with zip code of 11111 to zip code 22222 might result in several hundred database change requests before a commit. If a stable point has not been reached, a database rollback will be required.

At any point in time during the life of a transaction program, the transaction descriptors contain all of the information necessary to recover a particular transaction. A transaction descriptor is marked as "active" when the transaction descriptor is allocated/created. In the event that a transaction does not reach a stable point, the transaction issues a rollback request 603. The control information is updated 604 to reflect the transaction state as being rollback. If a host or component failure occurs, this state (e.g., either rollback or active) indicates to a recovery module that the transaction must be rolled back, since the data has not been committed. The retention data temporarily stored in the database retention memory structure 518 (FIG. 5) is copied back to the memory cache to negate the transaction update requests, as indicated at step 606. The destination messages may be discarded 608 (or alternatively subsequently overwritten), and the source messages are requeued 610 for subsequent rescheduling of the transaction program by moving the source message pointer in the source message pointer field 512 (FIG. 5) back into the input message queue 406 (FIG. 4). The audit data is updated 612 to indicate a transaction rollback event, and the audit data is queued 614 for subsequent writing to the audit trail by moving the audit data pointer in the audit data pointer field 508 (FIG. 5) to a queue designed to sequentially store the audit data in the audit trail. The transaction descriptor is then released 615 for use by other transactions.

In the event that the transaction does reach a stable point, the transaction issues a commit request 616, and the control information is updated 618 to reflect the transaction state as being "commit". The source messages, and the retention data temporarily stored in the database retention memory structure 518 (FIG. 5), are discarded or overwritten during a subsequent transaction, as shown at steps 620 and 622. The destination messages are queued 624 for subsequent transmission to the user terminal by moving the destination message pointer in the destination message pointer field 514 (FIG. 5) into the output message queue 421 (FIG. 4). The audit data is updated 626 to indicate a transaction commit event, and the audit data is queued 628 for subsequent writing to the audit trail by moving the audit data pointer in the audit data pointer field 508 (FIG. 5) to the queue designed to sequentially store the audit data in the audit trail.

The transaction descriptor is then released 629 for use by other transactions.

Where no host or components fail, transactions will be scheduled. Each transaction retrieves its source message and attempts to update one or more database records. If the transaction successfully updates the targeted records, i.e., reaches a stable point, then steps 616–629 occur. However, the transaction may be unsuccessful in updating the targeted records. For example, a record may not have been able to be read, or an error in the transaction program itself may prevent successful database updates. In this case, steps 603–615 occur. In the case of a transaction error which causes the transaction to abort, the system components (such as step control) issue a rollback request on behalf of the transaction at step 603.

In the case of a host or component failure, the control information from each transaction descriptor for the failing host or component is retrieved by the system recovery software operating under the control of a recovery mechanism (such as a non-failing host processor, or dedicated recovery processor). If the control information indicates "commit", steps 620–629 occur; otherwise, steps 606-615 occur.

Figure 7:
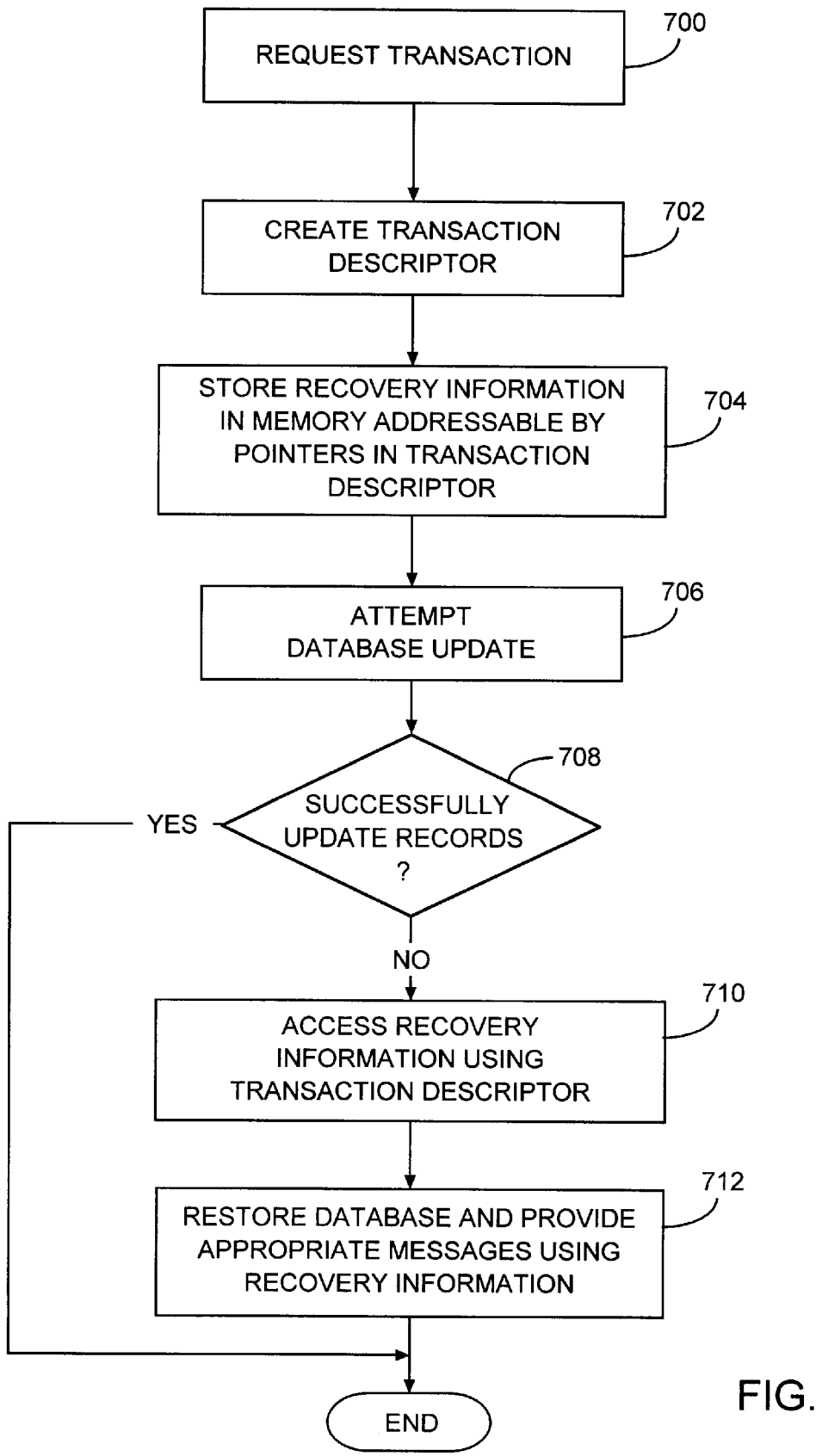
FIG. 7 is a flow diagram illustrating one embodiment of using transaction descriptors to maintain the database.

FIG. 7 is a flow diagram illustrating one embodiment of using transaction descriptors to maintain the database. A request is made 700 from a user terminal to a host processor to execute a database transaction. The database transaction may include a request to update or modify data stored in the database. A transaction descriptor for that transaction is then created when the transaction is scheduled for execution. Memory locations may be allocated in advance for the transaction descriptor, and the transaction identifier and data memory structure pointers can be added to the pre-existing transaction descriptor. Alternatively, the transaction descriptors may be dynamically allocated at the inception of the transaction.

Recovery information, which may include audit data, retention data, source and destination messages, is stored in the data memory structures addressed by the pointers as seen at step 704. An attempt to update the database is shown at step 706. Where the database records are successfully updated as seen as decision step 708, the transaction terminates normally. In the event that the database records are not successfully updated and no commit occurs, the recovery information is accessed 710 using the transaction descriptor pointers and transaction identifier, and the database is restored and appropriate source and destination messages can be accessed using the recovery information, as seen at step 712.

Figure 8:
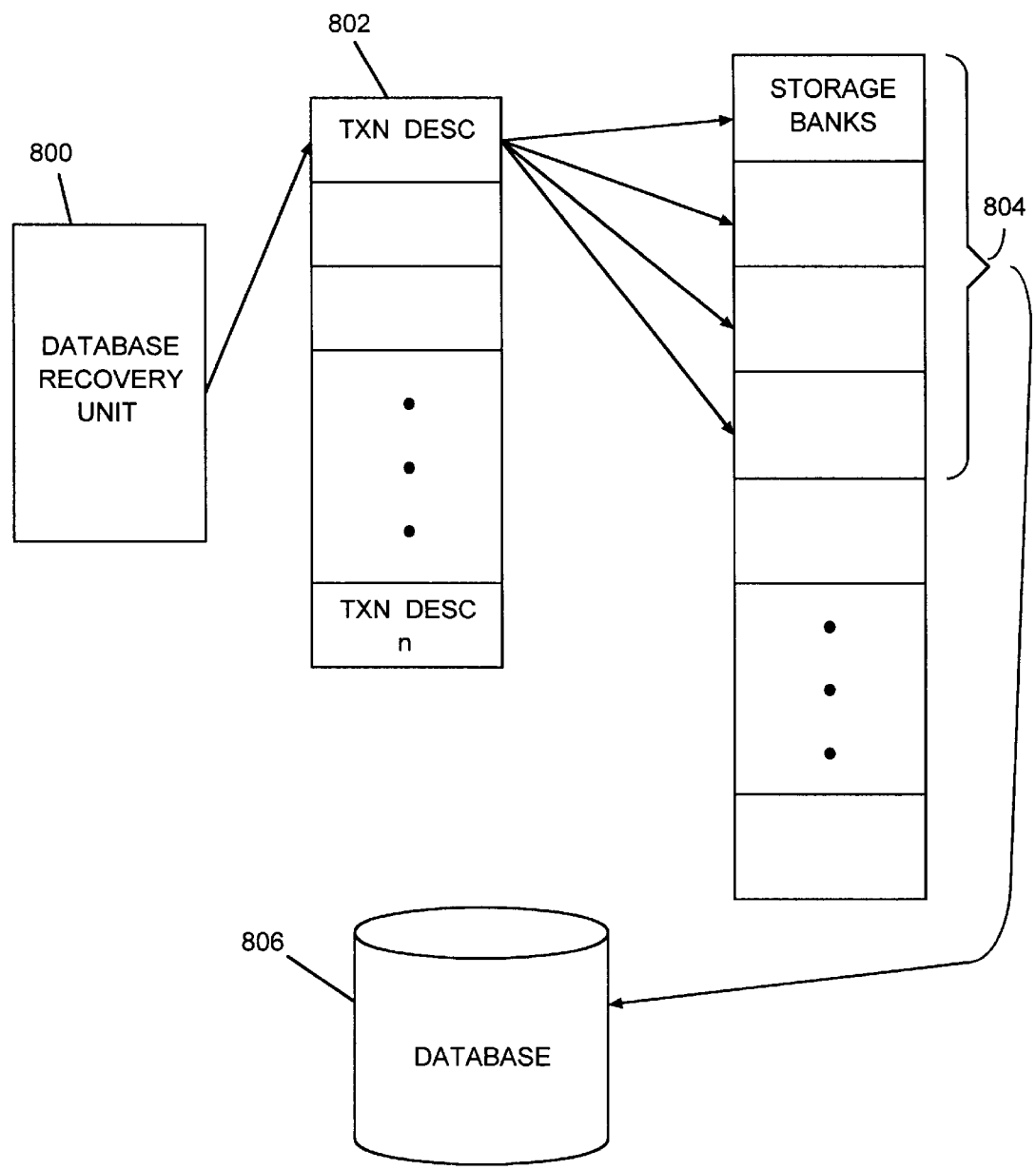
FIG. 8 is a block diagram illustrating one embodiment of a database recovery operation.

FIG. 8 is a block diagram illustrating one embodiment of a database recovery operation. A database recovery unit 800 accepts responsibility for accessing stored recovery information upon the failure of a particular transaction. The database recovery unit 800 may be the host processor that was running the transaction program, in which case the transaction program and/or host processor must itself recover prior to accessing the recovery information. Alternatively, the database recovery unit 800 may be an operational host processor in a multi-processor transaction processing system. In other words, where a host processor fails during a transaction, another host processor in the system may act as the database recovery unit 800. In fact, in an "n-host" environment, database recovery can be initiated on more than one host to expedite recovery.

The database recovery unit 800 locates the transaction descriptor 802 corresponding to the failed transaction, based on a transaction identifier stored in the control field of the transaction descriptor. The recovery information corresponding to the failed transaction is retrieved from the storage banks 804. The appropriate storage banks are located according to the pointers stored in the transaction descriptor 802. This retrieved information can then be written back to the database 806 to restore the database 806 to a previous state which was known to be valid.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patents is set forth in the appended claims.

What is claimed is:

1. A memory architecture for managing data recovery on a per-transaction basis in a transaction processing system, wherein the transaction processing system includes at least one transaction request unit for initiating data transactions with a database, the memory architecture comprising:
    (a) a plurality of storage modules to store transaction recovery information used in recovering from a transaction processing failure; and
    (b) a plurality of memory structures each corresponding to a distinct transaction to isolate accessibility of the transaction recovery information to the corresponding memory structure, each memory structure comprising:
        (i) a control information field to store a transaction identifier that identifies the distinct transaction to which it corresponds; and
        (ii) a plurality of information address fields, each of the address fields including a pointer to one of the storage modules which stores a portion of the transaction recovery information associated with the transaction identifier.

2. The memory architecture as in claim 1, wherein the plurality of storage modules and the plurality of memory structures comprise non-volatile random access memory.

3. The memory architecture as in claim 1, wherein the plurality of memory structures are arranged in a linked list.

4. The memory architecture as in claim 1, wherein the control information field is further configured to store a transaction state indicator to indicate whether the distinct transaction is active or has been terminated.

5. The memory architecture as in claim 4, wherein the control information field is further configured to provide an indication as to whether a terminated transaction has been committed to the database or has been interrupted during execution of the distinct transaction.

6. The memory architecture as in claim 1, wherein the plurality of information address fields comprises an audit data address field which includes a pointer to one of the storage modules that stores audit data associated with the transaction identifier, wherein the audit data corresponds to recovery information that reflects a most recent valid state of the database.

7. The memory architecture as in claim 1, wherein the plurality of information address fields comprises a database retention address field which includes a pointer to one of the storage modules that stores retention data associated with the transaction identifier, wherein the retention data corresponds to a valid state of a cached copy of a portion of the database that is being updated by the corresponding distinct transaction.

8. The memory architecture as in claim 1, wherein the plurality of information address fields comprises a source message address field which includes a pointer to one of the storage modules that stores source messages associated with the transaction identifier, wherein the source messages are used to initiate the data transactions and provide corresponding message data.

9. The memory architecture as in claim 1, wherein the plurality of information address fields comprises a destination message address field which includes a pointer to one of the storage modules that stores destination messages associated with the transaction identifier, wherein the destination messages are used to return an acknowledgment that a transaction request has been accomplished.

10. A transaction processing system for controlling data transactions between transaction request units and a database, and for restoring the database to a previously valid state in the event of a transaction processing failure, comprising:
    (a) at least one host processor coupled to at least one of the transaction request units to process transaction requests by way of one or more transaction programs;
    (b) a plurality of data storage modules to store data transaction recovery information;
    (c) a plurality of transaction memory structures, each corresponding to a distinct transaction to isolate accessibility of the transaction recovery information to the corresponding transaction memory structure, wherein each transaction memory structure comprises:
        (i) a control information field to store a transaction identifier that identifies the distinct transaction to which it corresponds;
        (ii) a plurality of information address fields, each including a data pointer to a specific one of the data storage modules which stores a portion of the data transaction recovery information associated with the distinct transaction;
    (d) a database recovery processor configured and arranged to utilize the transaction identifier in locating the transaction memory structure corresponding to a failed transaction, and to restore the database to the previously valid state using the data transaction recovery information identified by the plurality of information address fields.

11. The transaction processing system as in claim 10, wherein the plurality of data storage modules and the plurality of transaction memory structures comprise non-volatile random access memory.

12. The transaction processing system as in claim 11, wherein the non-volatile random access memory is coupled to each of a plurality of the host processors to allow access to the plurality of data storage modules and the plurality of transaction memory structures by any of the plurality of host processors.

13. The transaction processing system as in claim 12, wherein the database recovery processor is integral to one or more of the plurality of host processors.

14. The transaction processing system as in claim 10, wherein at least one of the data storage modules stores recovery data corresponding to a valid state of the database prior to the transaction.

15. The transaction processing system as in claim 10, wherein the plurality of transaction memory structures are contiguously arranged in a linked list.

16. The transaction processing system as in claim 10, wherein the plurality of information address fields comprises an audit data address field which includes a pointer to one of the data storage modules that stores audit data associated with the transaction identifier, wherein the audit data corresponds to recovery information that reflects a most recent valid state of the database.

17. The transaction processing system as in claim 10, wherein the plurality of information address fields comprises a database retention address field which includes a pointer to one of the data storage modules that stores retention data associated with the transaction identifier, wherein the retention data corresponds to a valid state of a cached copy of a portion of the database that is being updated by the corresponding distinct transaction.

18. The transaction processing system as in claim 10, wherein the plurality of information address fields comprises a source message address field which includes a pointer to one of the data storage modules that stores source messages associated with the transaction identifier, wherein the source messages are used to initiate the data transactions and provide corresponding message data.

19. The transaction processing system as in claim 10, wherein the plurality of information address fields comprises a destination message address field which includes a pointer to one of the data storage modules that stores destination messages associated with the transaction identifier, wherein the destination messages are used to return an acknowledgment to the transaction request unit that the transaction request has been accomplished.

20. A method for organizing recovery operations in a transaction processing system having a plurality of host processors and a database; comprising:

(a) requesting execution of a database transaction from a user terminal to one of the host processors, wherein the database transaction includes a database update;

(b) creating a transaction memory structure unique to the transaction, wherein the transaction memory structure includes a transaction identifier and a plurality of links to distinct storage banks;

(c) storing recovery information, which corresponds to the database transaction, in the distinct storage banks;

(d) accessing the recovery information corresponding to the database transaction upon failure of the transaction, utilizing the transaction identifier and the links of the transaction memory structure; and (e) restoring the database to a previously valid state by applying the recovery information to the database.

21. The method of claim 20, wherein creating a transaction memory structure comprises:

allocating a portion of a memory at the inception of the transaction identified by the transaction identifier; and partitioning the portion of the memory into a plurality of fields, wherein each field stores one of the plurality of links to the distinct storage banks.

22. The method of claim 20, further comprising providing access to the transaction memory structure and the distinct storage banks from all of the host processors in the transaction processing system.

23. The method of claim 22, wherein accessing the recovery information and restoring the database is accomplished by an operational one of the host processors.

* * * * *